Nov. 13, 1951          E. A. EDMONDS          2,574,818
OIL CHILLER
Filed Aug. 29, 1947          2 SHEETS—SHEET 1
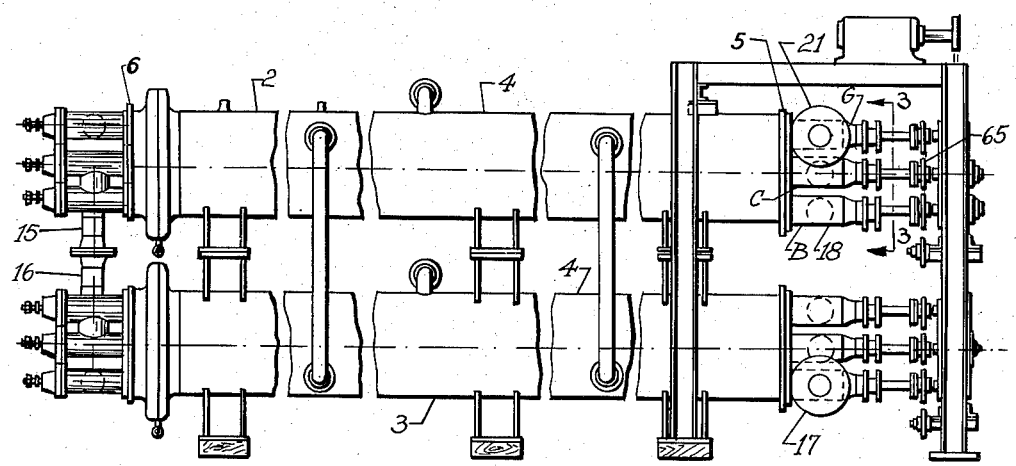
Fig. 1
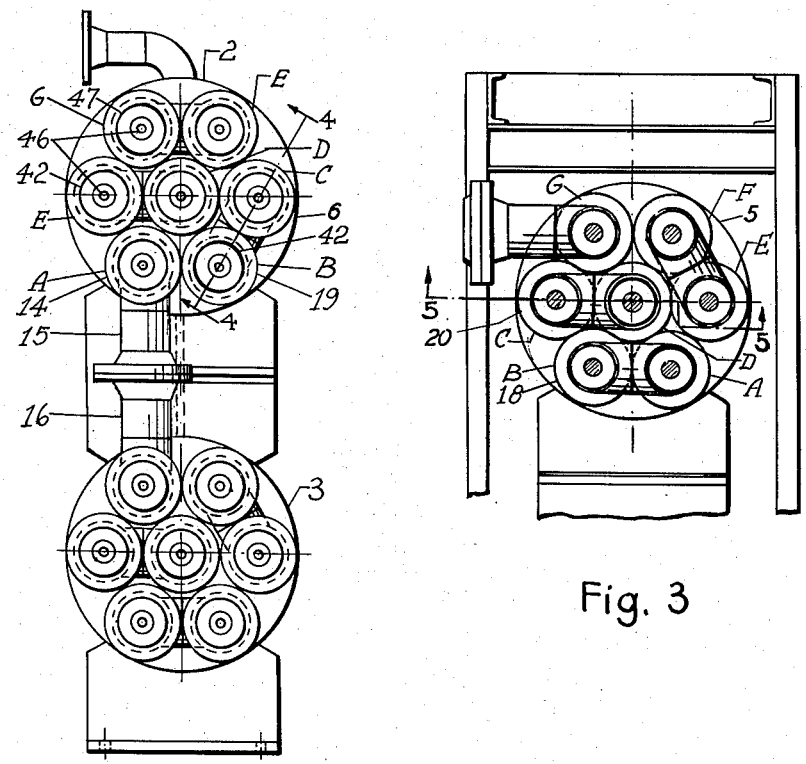
Fig. 2
Fig. 3
INVENTOR.
Eugene A. Edmonds
BY Arthur J. Robert
ATTORNEY Nov. 13, 1951  E. A. EDMONDS  2,574,818
OIL CHILLER Filed Aug. 29, 1947  2 SHEETS—SHEET 2

INVENTOR.
Eugene A. Edmonds
BY
Arthur Robert
ATTORNEY

Patented Nov. 13, 1951

2,574,818

UNITED STATES PATENT OFFICE 2,574,818

OIL CHILLER

Eugene A. Edmonds, Louisville, Ky., assignor to Henry Vogt Machine Company, Louisville, Ky., a corporation of Kentucky Application August 29, 1947, Serial No. 771,228

5 Claims. (Cl. 62—114)

The present invention relates to oil chillers, and relates in particular to improvements in the structure thereof for facilitating and reducing the cost of manufacture thereof.

In my Patent No. 2,405,944 there is shown and described a chiller structure comprising a plurality of units, each unit comprising a shell adapted to contain a refrigerant, and having a plurality of tubes therein through which flows the oil to be chilled, the ends of the tubes being alternately interconnected by reverse fittings. Because of the low temperatures and the pressures employed, and the confined space at the end of each chiller unit, the construction of such units presents a difficult manufacturing problem. The manufacturing problem is further complicated by the necessity of providing for easy repair of the structure, or replacement of broken parts.

It is an object of the present invention to provide a chiller unit having the tubes interconnected by a structure which is easy to assemble or disassemble.

A further object is the provision in a chiller unit of a reverse fitting structure at the ends, which may be prefabricated in small units and is easily assembled to the unit.

Another object is the provision in a chiller unit or reverse fittings for the tail end opposite the driving end, which provides a simple support for the scraper, and which enables the scraper unit to be removed without dismantling the driving end.

Another object is the provision of a chiller unit having an improved indicator assembly which may be removed without disturbing the scraper.

In accordance with one feature of the present invention, the tubular units and outer shell are welded to suitable tube sheets or end plates, and the reverse fittings, which are prefabricated of welding T's and flanges into a unitary fitting, are bolted to the tube sheets. This construction has the advantage that the labor involved in making the reverse fittings is reduced, and the reverse fittings are readily removable to give access to the tubular units for replacement or repair. Furthermore the prefabrication of the reverse fittings from welding tees and flanges permits such fittings to be normalized and machined to accurate dimensions, prior to assembly to the chiller unit, so as to eliminate strains within the fittings. The prefabrication of the fittings also eliminates the welding of the T's in the confined space at the ends of the tube. For example, a chiller unit carrying seven six-inch tubes in a sheet twenty-seven inches in diameter provides a space of only about three inches between tubes, and in such confined space the welding of the fittings is exceedingly difficult to accomplish.

A further feature of the invention is the provision of a removable tail end structure which carries the scraper bearing, the scraper being releasably coupled to the drive shaft, so that upon removal of the tail end cover the scraper may be removed without disturbing the drive end. The tail end cover may also carry a suitable shouldered rotation indicator extending through a stuffing box therein and which is removable without removal of the tail end cover.

The invention will be described in greater detail in connection with the accompanying drawings showing a preferred embodiment of the invention by way of example, and wherein:

Figure 1 is a side elevation of a chiller with parts broken away,

Figure 2 is an end view of Figure 1 as viewed from the left.

Figure 3 is a sectional view taken on line 3—3 of Figure 1,

Figure 4:
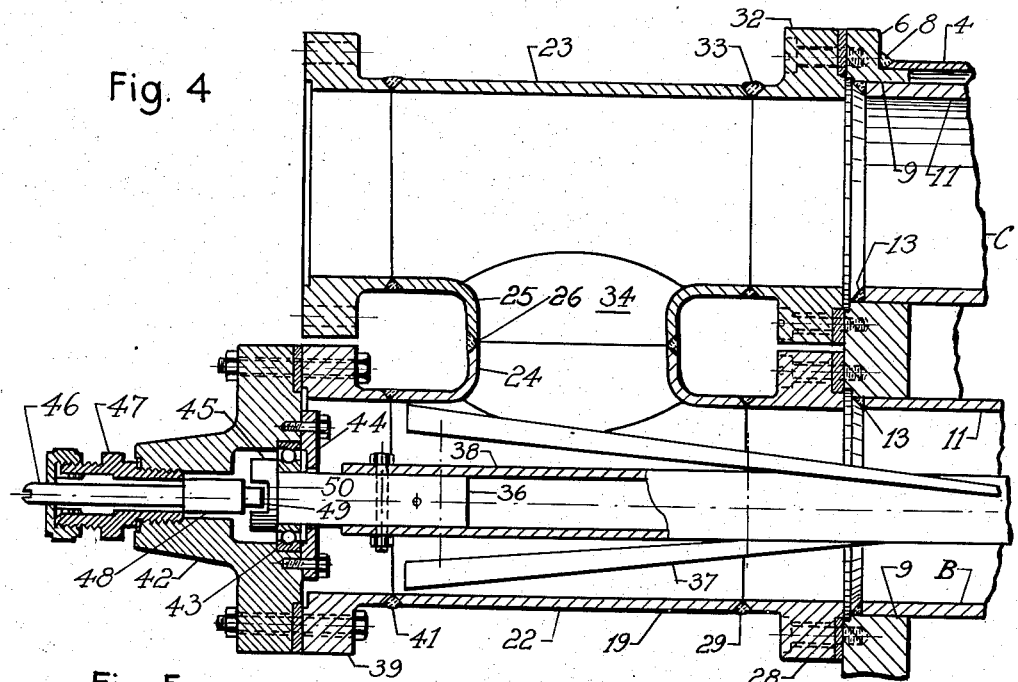
Figure 4 is a sectional view taken on line 4—4 of Figure 2, with parts removed

Referring to the drawing, Figure 1, there is shown a framework supporting a pair of chiller units 2, 3 which are similar so that only one unit will be described in detail. Each chiller unit comprises an outer cylindrical shell 4 (Figs. 1, 4 and 5) terminating in flanged tube sheets 5 and 6, the shells 4 being suitably welded at their ends to the tube sheets, as indicated at 7 and 8. Each tube sheet has a plurality of apertures 9 therein, and a tube 11 is received in each aperture 9 and is welded at its ends 12 and 13 to the tube sheets. Although all the tubes are alike, the seven tubes of unit 2 in shell 4 are designated as A, B, C, D, E, F, G, for the purpose of facilitating the description.

At the left or inlet end of unit 2 a flanged T fitting 14 (Fig. 2) is provided at the end of a tube 11 (A), the fitting being bolted to the tube sheet 6 in alignment with a tube 11 and having a branch 15 suitably connected to the outlet 16 of lower unit 3. Oil enters the lower unit at 17 (Fig. 1), and after traversing the unit exits therefrom through branches 16 and 15 to tube 11 (A) (Fig. 2) of the upper unit and flows to the right as viewed in Fig. 1. At the right end of tube 11 (A) the oil is conducted by a reverse fitting 18 (Figs. 1 and 3) to a tube 11 (B). Oil passes to the left through tube 11 (B) and at the left end is conducted by a fitting 19 (Figs. 2 and 4) to tube 11 (C) flowing to the right in tube 11 (C), and by a reverse fitting 20 to tube 11 (D), and so on, and is discharged at the right end of tube 11 (G) through a T fitting 21 similar to fitting 17. The fitting 19 between tubes 11 (B) and (C) at the left end now will be described.

Figure 5:
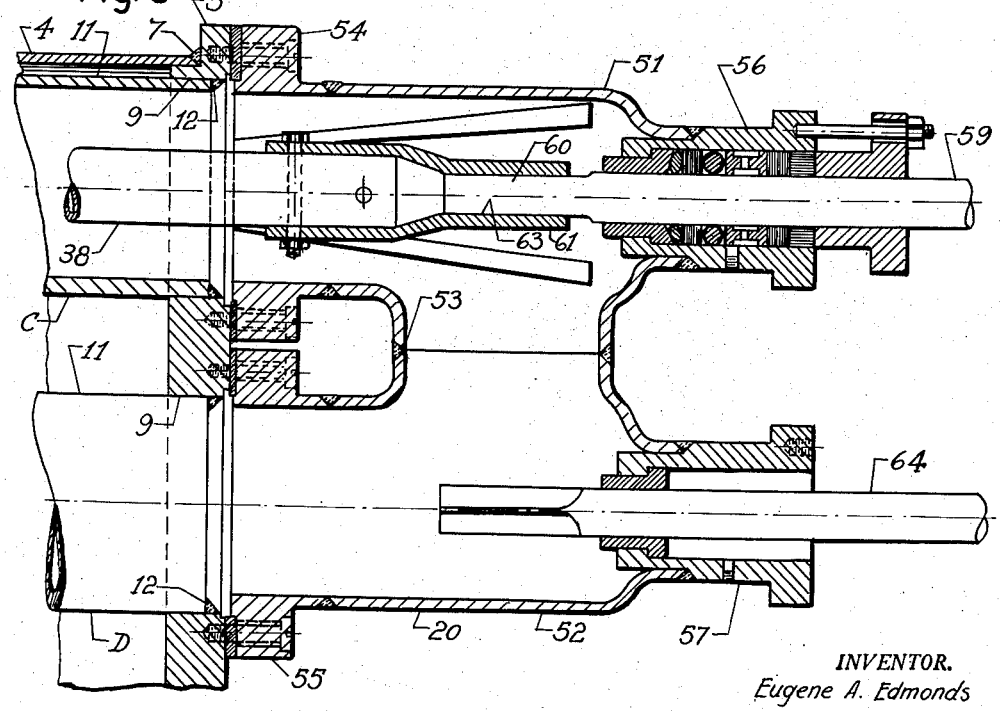
Figure 5 is a sectional view taken on line 5—5 of Figure 3 with parts removed.

Referring to Fig. 4, two welding T's 22 and 23 have the stem ends 24 and 25 welded together at 26 to provide an H-structure or fitting designated generally by the numeral 19. One end of T 22 has a flange 28 welded thereto at 29, and the corresponding end of the other fitting has a flange 32 similarly welded thereto at 33. Flanges 28 and 32 are bolted to the tube sheet 6 in alignment with tubes 11 (B) and (C), so that oil, after flowing from right to left in tube 11 (B), is conducted by the reversing passageway 34 of the fitting into tube 11 (C) through which it flows from left to right.

Each tube 11 contains a stub shaft 36 upon which is bolted or otherwise removably secured a scraper 37 on a sleeve 38 which rotates with the shaft, the scraper serving to remove accumulated wax from the insides of the tubes and to improve heat exchange. The portion 22 of the fitting 19 has a flange member 39 welded to its end at 41 and a bonnet 42 is suitably bolted to the flange. A combined thrust and radial ball bearing assembly 43 is held in a recess in the bonnet by a suitable plate 44 and the shaft 36 passes through the bearing and has an integral head 45 which bears longitudinally against the bearing. An indicator shaft 46 passes through a suitable stuffing box 47 threaded into the bonnet and has an enlarged head 48 with a tongue 49 received in a recess or slot 50 in the head 45, so as to be rotatably coupled thereto by an Oldham type coupling. The head 48 engaging the stuffing box 47 prevents the indicator shaft from being blown out by internal pressure. Portion 23 is of identical construction and therefore is not described in detail.

The fitting 20 at the opposite or right end of tube 11 (C) is similarly made up of two reducing T's 51, 52 (Fig. 5) welded together at 53 to form an H-structure, and having flanges 54 and 55 welded thereto by which the fitting is bolted to the tube sheet 5 in alignment with tubes 11 (C) and (D). The T's 51 and 52 have reduced opposite ends to which are welded stuffing boxes 56 and 57. A drive shaft 59 having a square end 60 passes through the stuffing box 56, and is retained against the internal pressure in any suitable manner. A sleeve 61 has one end bolted to scraper shaft 38, the other end providing a squared socket 63 which receives the square end 60 of the drive shaft. The coupling member or sleeve 61 may be made by forging a steel sleeve, or in any other suitable manner. Shaft 64 is similarly coupled to a scraper sleeve (not shown) and is not described in detail. It will be understood that the reverse fittings at the left end are all identical, and the reverse fittings at the right end are identical, so that no further description thereof is needed to explain their construction. Shafts 59, 64, etc. carry sprockets 65 at their ends, over which passes a suitable motor driven chain (not shown) by which arrangement the scrapers in each tube 11 are rotated. If desired, each scraper may be rotated by an individual hydraulic motor.

The welded reverse fittings 19, 20 and the welded elbow fittings 14, 17 and 21 can be prefabricated before assembly to the tube sheets, with the aid of suitable jigs or fixtures, after which they are normalized to relieve strains and are machined to the required dimensions. As such parts are of small dimension they may be readily handled in the fabrication operation. These fittings are bolted to the tube sheets 5 and 6 and are readily removable so that the tubes 11 through which the oil flows are thus rendered accessible for replacement or repair. To renew the tubes it is necessary only to remove the reverse fittings, chip out the weld between a tube 11 and the tube sheet, and insert and weld a new tube in place, then replace the bolted fitting.

The pressure thrust on the scraper shaft 36 is carried by the bearing 43, which may be of the combined radial and thrust type, the head 45 bearing against the bearing which is retained by plate 44. The indicator shaft 46 is coupled by the tongue and groove connection 49, 50 to the scraper shaft, and the enlarged end 48 provides an abutment shoulder which engages the stuffing box 47. The indicator shaft can be removed by removing the stuffing box 47 from the bonnet 42, releasing the packing gland thereof, and withdrawing the indicator. The scraper is accessible without disturbing the drive end of the apparatus. To remove the scraper it is necessary only to remove the bolted bonnet 42 from the flange end 39 of the fitting, whereupon the scraper shaft 36, scraper sleeve 38, scraper shaft 62 and coupling sleeve 61 may be removed through the opening thus provided, the coupling sleeve 61 being carried along with the scraper. In assembly it is necessary only to apply the ball bearing member 43 to the stub shaft 36, secure the plate 44 to the bonnet 42 and the scraper to the stub shaft, and insert the scraper into tube 11 to couple the sleeve 61 to shaft 59, and then bolt the bonnet in place. The stuffing box 47 carrying the indicator shaft 46 then can be threaded into the bonnet to couple the tongue 49 into groove 50. The repair or replacement of the various parts thus is greatly simplified.

The chiller construction herein described is easy to manufacture or assemble, and the parts are readily accessible for replacement or repair. The cost of manufacture also is reduced by fabricating the reverse fittings in small units, and such units are easy to assemble and disassemble from the tube sheets.

Having described my invention, I claim:

1. An oil chiller comprising perforate end plates, an outer shell welded at the ends to the periphery of said end plates, a series of tubes in said shell welded at the ends thereof in the perforations of said end plates, preformed reverse connections between alternate pairs of tubes at one end, each comprising a pair of welding T members together to provide an H-shaped reverse connection member, flanges welded to one set of ends of said T members, bolts in said flanges for detachably securing said reverse connection members to said end plates, stuffing box members prewelded to said reverse connection members at the drive side opposite said flanges, drive shafts extending through said stuffing boxes, and scraper members in said tubes providing sockets removably coupled to said drive shafts.

2. An oil chiller comprising a pair of end plates; a series of tubes secured in said end plates; flanged generally H-shaped reverse connections between alternate pairs of tubes at one end bolted to an end plate; bonnets detachably secured to the exterior ends of the reverse connections, an end thrust bearing member secured in each bonnet; a shaft journalled in each bearing member and having a flange exterior of the bearing limiting endwise movement of the shaft, whereby the bearing takes the endwise thrust of the shaft; a scraper detachably connected to said shaft and a slip joint socket at the opposite end of the scraper for reception of a drive shaft, the axial openings through the H-connections being of a size to allow the scraper to be removed therethrough upon removal of the bonnet and bearing.

3. An oil chiller as specified in claim 2 having a stuffing box removably attached in each said bonnet, and an internally shouldered shaft detachably coupled to said shaft flange and extending through the stuffing box with the shoulder thereof engaging the stuffing box.

4. An oil chiller comprising: perforate end plates; an outer shell welded at the ends to the periphery of said end plates; a series of tubes in said shell welded at the ends thereof in the perforations of said end plates; H-shaped reverse connection members between alternate pairs of tubes at each end, said connection members having flanges at one set of ends thereof and having stuffing box members at the drive ends opposite said flanges; bolts in said flanges for detachably securing said reverse connection members to one said end plate; drive shafts extending through said stuffing boxes; and scraper members in said tubes providing sockets removably coupled to said drive shafts.

5. An oil chiller comprising: perforate end plates; an outer shell permanently attached at the ends to the periphery of said end plates; a series of tubes in said shell permanently attached at the ends thereof in the perforations of said end plates; preformed H-shaped reverse connection members between alternate pairs of tubes at each end, said connections having flanges at one set of ends thereof and having stuffing box members at the drive ends opposite said flanges; bolts in said flanges for detachably securing said reverse connection members to one said end plate; drive shafts extending through said stuffing boxes; and scraper members in said tubes providing sockets removably coupled to said drive shafts.

EUGENE A. EDMONDS.

REFERENCES CITED

The following references are of record in the file of this patent:

UNITED STATES PATENTS

| Number | Name | Date |
| --- | --- | --- |
| 2,032,201 | Davis et al. | Feb. 25, 1936 |
| 2,137,373 | Williams, Jr. | Nov. 22, 1938 |
| 2,181,602 | Keeran | Nov. 28, 1938 |
| 2,182,556 | Griswold | Dec. 5, 1939 |
| 2,189,235 | Wanner | Feb. 6, 1940 |
| 2,405,944 | Edmonds | Aug. 20, 1946 |